Aug. 11, 1953 R. V. TIEDE 2,648,808
REACTIVE SPEED-TORQUE CONTROL OF INDUCTION MOTORS
Filed April 10, 1950 2 Sheets-Sheet 1
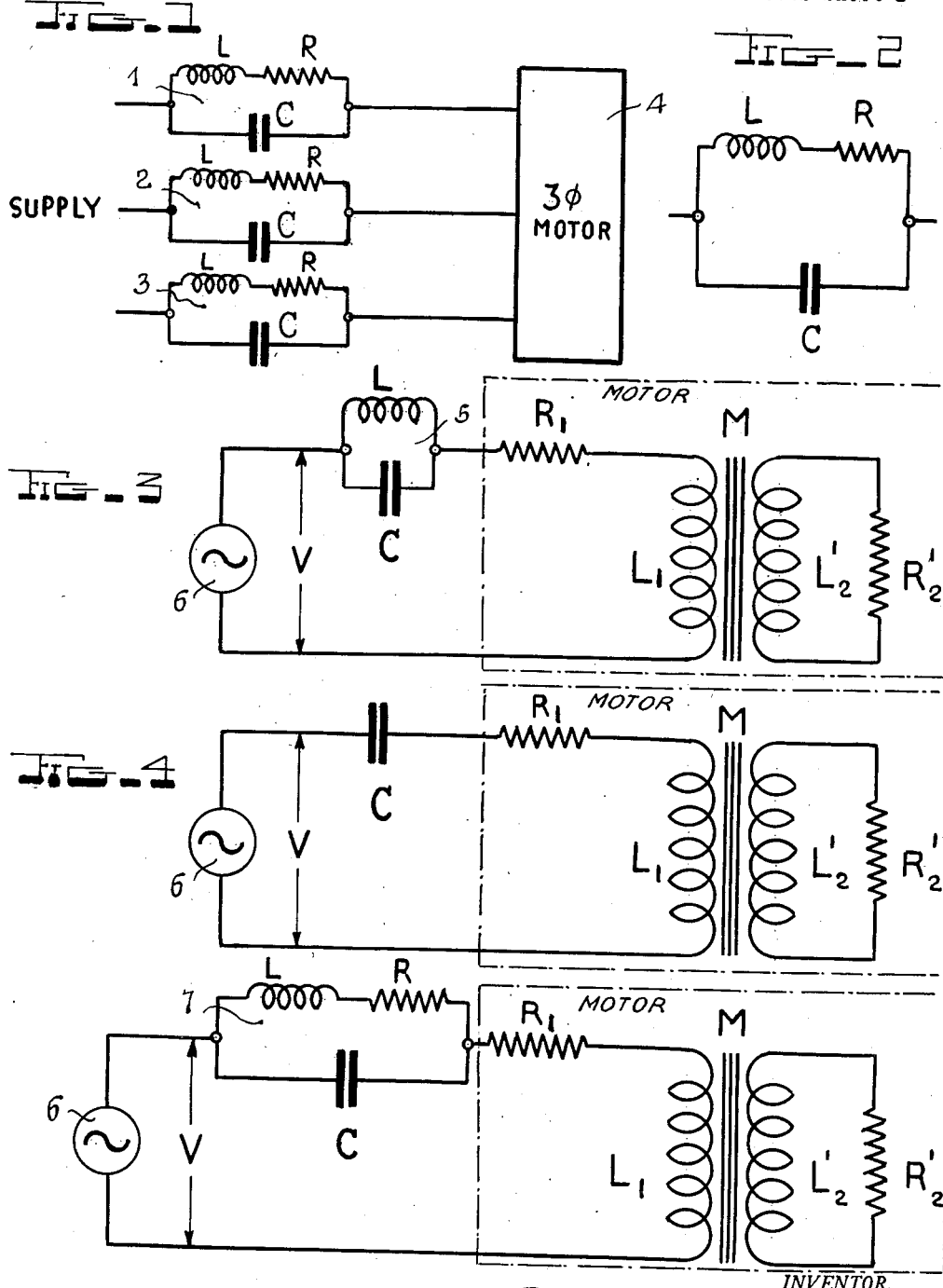
INVENTOR.
Roland V. Tiede,
BY
John A. Brady
ATTORNEY

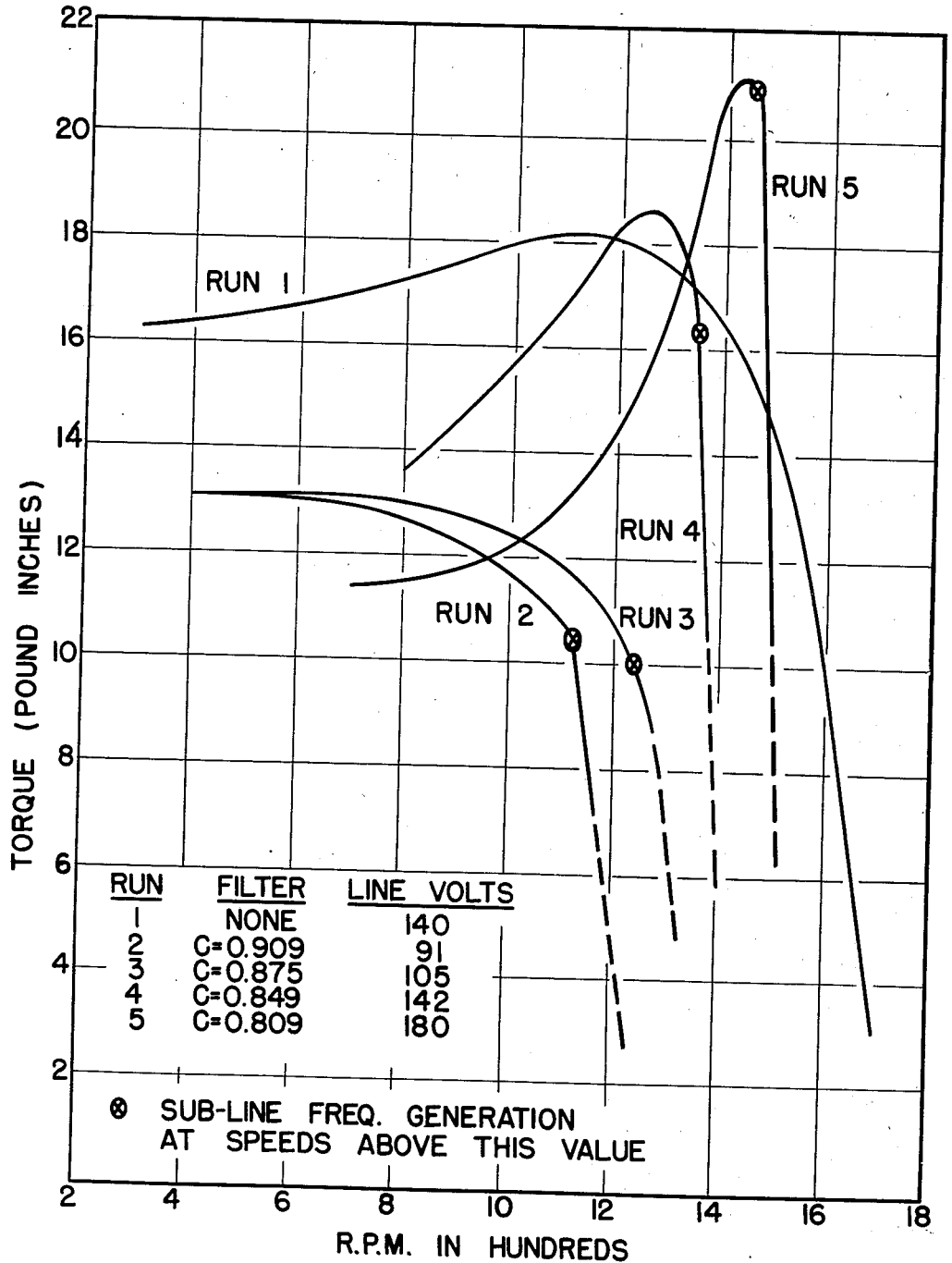

Patented Aug. 11, 1953

2,648,808

UNITED STATES PATENT OFFICE 2,648,808

REACTIVE SPEED-TORQUE CONTROL OF INDUCTION MOTORS

Roland V. Tiede, Fort Bragg, N. C.

Application April 10, 1950, Serial No. 154,901

7 Claims. (Cl. 318—229)

My invention relates broadly to induction motors and more particularly to alternating current motors and method of operating the same, in which the currents in a secondary winding are induced by currents flowing in primary windings connected to the supply lines, whereby the motor torque may be varied by varying the effective impedance of the primary windings.

One of the objects of my invention is to provide a method whereby the torque characteristic of induction motors may be varied within wide limits.

Another object of my invention is to provide practical and continuous control of the torque characteristic of induction motors.

Still another object of my invention is to provide a circuit arrangement for induction motors for imparting to such motors improved starting and speed regulating characteristics.

A further object of my invention is to provide a method for controlling the speed of induction motors within very close limits.

A still further object of my invention is to provide a method for improving power factor of induction motors at all speeds and loads.

Still another object of my invention is to provide an impedance control circuit arrangement for improving the efficiency of induction motors.

A further object of my invention is to provide a method whereby induction motors used primarily in servo-mechanism and control applications and usually designated as torque motors can be provided with a torque characteristic which is essentially independent of motor speed over the usual operating range of such motors.

Another object of my invention is to provide an electrical circuit arrangement which makes possible the speed, torque, power factor and efficiency control of induction motors without the use of any control elements, electrical connections, or switching devices in or attached to the rotor of the motor, whereby the size of the rotating member is reduced, the motor construction is simplified, and the motor cost is reduced.

Other and further objects and advantages of my invention will hereinafter appear in the following specification by reference to the accompanying drawings, in which:

Figure 1 schematically illustrates the application of the control circuit of my invention to a three-phase power supply circuit for a three-phase motor;

Fig. 2 schematically shows an arrangement of one of the control circuits for the reactive control of induction motors;

Fig. 3 shows one form of reactive control circuit applied to an induction motor system;

Fig. 4 shows another form of reactive control circuit applied to an induction motor system;

Fig. 5 illustrates the application of the reactive circuit of Fig. 2 for the control of induction motors; and Fig. 6 illustrates a series of characteristic curves showing the speed-torque characteristics of an induction motor with different values of reactive control circuits interposed in the power supply circuit of the induction motor according to my invention.

My invention comprises a circuit arrangement for an alternating current motor having a stator provided with one or more energizing windings which create a magnetic flux and a rotor provided with one or more secondary windings interlinked with said flux and one or more variable reactive filter elements connected in series with one or more of the energizing windings, said filter elements being adjusted so that their reactance is capacitative at the supply frequency.

The basic principle of operation of such a combination can be described in its simplest terms somewhat as follows: As is well known to those skilled in the art, the expression for the rotor slip at maximum torque is actually an expression for impedance match between rotor and stator. The value of slip, and therefore of motor speed, at which this occurs can therefore be controlled by varying either the effective rotor impedance or the effective stator impedance. The control of the torque characteristic by means of an impedance which is capacitative at supply frequency and which is interposed between the supply line and the primary winding is the basis of my invention. The highest value of slip and consequently the lowest speed for which maximum torque can be made to occur is determined by the ratio of rotor to stator resistance, since for this case the impedance match has become a resistance match and the auxiliary capacitative reactance has just cancelled the effective inductive input reactance of the motor. The addition of still more capacitative reactance again reduces the value of slip, i. e., increases motor speed, for which the motor develops maximum torque, but now the motor draws leading current at the speed for maximum torque.

The second basic phenomenon inherent in the system of my invention is as follows: The capacitative reactance of the filter device placed in series with the primary winding combined with the effective input inductance of the motor determines a natural frequency which is, in general, lower than the supply frequency. To this natural or sub-line frequency there corresponds a sub-line synchronous speed. If the motor operates at speeds greater than the sub-line synchronous speed, its resistance to sub-line frequency currents becomes negative, i. e., it begins to generate the sub-line frequency with the result that the available motor torque is rapidly reduced to zero.

Referring to the drawings in more detail, Figure 1 illustrates the application of the circuit of my invention in a three-phase power supply circuit to a three-phase motor. I have shown reactive control circuits 1, 2 and 3 interposed in each of the power supply leads extending to the three-phase motor 4. The reactive control circuits each includes inductance element L in series with resistance element R, which is in general the inherent resistance of inductive element L but may be an additional resistance, the two elements being shunted by capacity element C. The circuit forms a closed loop including inductance element L; resistance element R; and capacity element C, which is interposed in series with each of the power supply leads to motor 4.

In Fig. 2 I have shown the arrangement of the closed loop circuit on an enlarged scale, illustrating more clearly how the capacity element C shunts both the inductance element L and the resistance element R connected in series.

If the filter device placed in series with the primary be a parallel L-C filter of the type illustrated in Fig. 3, its components may be so adjusted as to give it the desired value of capacitative reactance at the supply frequency required for the aforementioned control of the torque characteristic. Furthermore, it may also be designed so that its anti-resonant frequency, i. e., the frequency below which its reactance becomes inductive, determines to a sub-line synchronous speed at any desired point between the speed for maximum torque and synchronous speed at supply frequency. Thus the motor can be made to have very close speed regulation above the speed at which sub-line frequency generation begins. Furthermore, the maximum speed at which the motor will operate can be pre-set by controlling the size of the filter elements.

The anti-resonant frequency of the parallel L-C filter is not identical with the sub-line frequency at which the motor begins to generate power back into the supply line thus reducing the motor torque to zero. The sub-line frequency is slightly higher than the anti-resonant frequency of the filter since the series reactance of the filter must be capacitative in order to excite the motor and thus resonate the motor winding. For practical purposes, however, the series filter reactance changes so rapidly near the anti-resonant frequency that the sub-line frequency, and therefore the corresponding sub-line synchronous motor speed at which sub-line frequency generation begins, can be taken for design purposes to be the anti-resonant frequency of the filter alone.

Fig. 3 represents one arrangement of the basic circuit elements of one phase only of a motor of the aforementioned type. In this drawing V represents the supply voltage from alternating current source 6 which may be variable; L and C represent the inductance and capacitance respectively of a typical filter circuit 5 placed in series with the motor primary; $R_1$ is the per phase value of motor primary winding resist-ance; M is the per phase value of the mutual inductance between the primary and secondary motor windings referred to the primary winding; $L_1$ represents the per phase value of the motor primary winding self-inductance; $L'_2$ is the per phase value of the motor secondary winding self-inductance referred to the primary; and $R'_2$ is the per phase value of motor secondary winding resistance referred to the primary. There will then be a reactance, $X_f$, representing the series reactance of the filter at the supply frequency, and reactances $X_1$, $X_m$, and $X'_2$ corresponding to inductances $L_1$, M, and $L'_2$ also at supply frequency. The coefficient of coupling K between primary and secondary may then be defined as follows:

$$K = \frac{X_m}{\sqrt{X_1 X_2}} \quad (1)$$

Another coefficient, c, hereinafter referred to as the control factor, may then be defined as follows:

$$c = \frac{X_1 + X_f}{X_1} \quad (2)$$

For values of $X_f$ which are capacitative, i. e., negative, it is clear that the control factor can be reduced to values less than unity.

In terms of the parameters thus defined it may be shown that the expression for the rotor slip, $s_m$, for which the motor develops maximum torque is given by:

$$s_m = \frac{cR'_2}{\sqrt{X_1^2(c-K^2)^2 + R_1^2}} \quad (3)$$

It is clear from the foregoing Equation 3 that the maximum slip for which maximum torque occurs is obtained when the control factor, c, is made equal to the square of the coefficient of coupling, k. This yields the resistance match referred to hereinbefore. It is also clear that the value of the control factor required to obtain maximum torque at a given value of slip can be calculated from Equation 3. Furthermore, having determined the desired value of the control factor the required capacitative reactance at supply frequency is determined from Equation 2. Thus the required value of series per phase reactance for any given operating characteristic is determined in terms of the motor constants and the desired slip for maximum torque.

A filter of the type illustrated in Fig. 3 can now be calculated from well known relations. Actually such a parallel L-C filter 5 always contains a resistance which is inherent in the inductive branch. Fig. 2 illustrates such a filter including the inherent resistance R and the inductance L and capacitance C. The series impedance of such a filter at supply frequency, f, is given by the following relation:

$$Z_f = \frac{R + j2\pi f[L(1-4\pi^2 f^2 LC) - CR^2]}{(1-4\pi^2 f^2 LC)^2 + 4\pi^2 f^2 C^2 R^2} \quad (4)$$

One of the requirements imposed on the filter for a given operating characteristic is thus that the imaginary portion of the impedance calculated from Equation 4 represent a capacitative reactance of the magnitude calculated hereinbefore. The second requirement is that the anti-resonant frequency of the filter is adjusted so that it is just below the frequency which corresponds to the synchronous speed above which it is desired that the motor torque go to zero.

Let this frequency be designated as $f_n$. It is given by the well known relation:

$$4\pi^2 f_n^2 = \frac{1}{LC} - \frac{R^2}{L^2} \quad (5)$$

Thus the values of the filter components are determined since they must satisfy both relations (4) and (5).

Equation 5 is obtained by equating the imaginary part (i. e. the reactance) of Equation 4 to zero. This determines the frequency at which the reactance of the parallel L-C filter reverses sign and is sometimes referred to as the anti-resonant frequency. At frequencies below $f_n$ the reactance of the filter is inductive; at frequencies above $f_n$ the reactance is capacitative.

The application of reactive speed-torque control to torque motors for the purpose of making their torque characteristic essentially independent of speed over the normal speed range of such motors does not in general require a series filter. Instead of simple capacitor, C, illustrated in Fig. 4 is placed in series with each primary phase winding. Its value can again be calculated from Equations 2 and 3 the only requirement being that the slip for maximum torque be made to have a value slightly less than unity (speeds slightly greater than stall).

In Fig. 5 I have shown the connection of the reactance control circuit of Fig. 2 in series at 7 between the variable voltage power supply source 6 and the primary circuit of the induction motor with the inherent resistance R interposed in series with the inductive element of the control circuit. The balance of the circuit is the same as that heretofore described and the operating characteristics thereof are similar.

In Fig. 6 I have illustrated the relative performance characteristics of an induction motor where the speed-torque characteristic changes with changes in the value of the series reactance employed. The curves are plotted in which the abscissa designates hundreds of revolutions per minute, and the ordinates designate the motor torque in pound inches. Run 1 of the motor produces a curve showing the natural speed-torque characteristic of the induction motor where the control factor is unity, that is, where there is no series reactance of any kind used. Under this condition the curve for run 1 represents the speed-torque characteristic of the induction motor itself. The curves for runs 2, 3, 4 and 5 illustrate the changes in the speed-torque characteristics of the induction motor brought about by varying the degrees of speed control achieved by changing the value of the series reactance employed. In the table associated with the curves I have indicated the values of the speed control factor used with four different conditions of line voltage variation. The points at which sub-line frequency generation begins are also illustrated and the effect thereof on the net torque of the motor is shown. The difference in the torque speed characteristic by changing the reactance value is strikingly apparent. Variation of line voltage together with reactive control makes possible an almost infinite variety of characteristics so that almost any requirement may be met. When a definite series of requirements are determined a switching arrangement may be provided for successively connecting the required series reactances into the circuit between the power supply source and the motor to combine the proper voltage variation with the variation of the series reactance to meet the required speed-torque characteristics for the motor.

Sub-line frequency generation begins when the real portion or the resistive part of the impedance of the expression for motor input impedance $Z_i$ becomes negative. The expression for $Z_i$ in terms of the parameters already defined is $$Z_i = R_1 + \frac{sR'_1 X^2_m}{R'^2_2 + s^2 X'^2_2} + j\left[X_1 - \frac{sX'_2 X^2_m}{R'^2_2 + s^2 X'^2_2}\right] \quad (6)$$

In the foregoing expression $s$ denotes the value of slip of the induction motor on a per-unit basis, and $Z_i$ denotes the per-phase value of the input impedance of the induction motor. The portion of the above expression which is multiplied by the imaginary operator $j$ is the reactance portion of the impedance.

When the real portion of Equation 6 is set equal to zero and solved for the value of slip $s_g$ for which generator action begins, the following equation is obtained:

$$s_g = \frac{K^4 R'^2}{2R_1} - \sqrt{\frac{K^4 R'^2_2}{4R_1^2} - \frac{R'^2_2}{X'^2_2}} \quad (7)$$

The values of slip calculated from Equation 7 will be very small for the usual range of motor constants and therefore the input reactance of the induction motor at this value of slip $s_g$ will be very nearly the self reactance of the primary winding. If either a series capacitor as shown in Fig. 4 or an LC filter as in Fig. 3 which acts as a series capacitance at frequencies above the anti-resonant frequency of the filter is inserted in series with the primary winding for the purpose of speed control there will exist a resonant frequency of the system. This resonant frequency neglecting resistance will be given by the relation:

$$\omega_n = \frac{1}{L_i C} \quad (8)$$

where $L_i$ is the effective per-phase input inductance of the motor; and where C is the capacitance when a straight capacity is employed and is the capacitance of the parallel LC filter at the resonant frequency of the system when such an LC filter is employed.

Corresponding to this natural angular frequency $\omega_n$, there will be a synchronous speed, $N_n$. At this speed the input inductance of the motor will be from Equation 8, the self-inductance of the primary winding. At speed $N_n$, which is the synchronous speed that corresponds to the synchronous speed $\omega_n$ the term $L_i$ that is the per-phase value of the self inductance of the primary winding may be substituted for $L_i$.

For values of the control factor $c$, less than unity, the ratio set forth in Equation 8 will be such that $\omega_n$ is less than line frequency and therefore sub-line frequency generation begins.

It should be noted that the method is applicable to motors designed for single-phase operation as well as polyphase motors of any number of phases. Furthermore, there are many modifications of the basic concept of my invention and while I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States, is as follows:

1. A system for speed-torque control of induction motors comprising in combination with an induction motor including a primary and secondary circuit, an alternating current power supply source, connections between the primary circuit of said induction motor and said alternating current power supply source, said connections including a filter circuit containing inductance, capacity and resistance elements electrically connected in a loop circuit disposed in series between said power source and said primary circuit said loop circuit in combination with the input inductance of said induction motor determining a resonant frequency which is lower than the alternating current power supply source frequency for controlling the speed-torque characteristics of said induction motor, by causing its torque to drop rapidly at speeds greater than the synchronous speed corresponding to said resonant frequency, and said loop circuit changing the value of slip for which impedance match between the primary and secondary circuits of the motor exists thus altering its speed-torque characteristic by changing the speed at which maximum torque occurs.

2. A system for speed-torque control of induction motors comprising in combination with an induction motor, an alternating current power supply source, connections between said alternating current power supply source and said induction motor, a loop circuit including inductance, capacity and resistance, said loop circuit being disposed electrically in series in said connections between said alternating current power supply source and said induction motor, the components of said loop circuit being so proportioned that the frequency above which its reactance becomes capacitative determines a speed at a selected point between the speed for maximum torque and synchronous speed of the motor at the supply frequency of said alternating current power supply source for controlling the torque-speed characteristics of said motor.

3. A system for speed-torque control of induction motors comprising in combination an alternating current power supply source, an induction motor having primary and secondary windings, connections from said alternating current power supply source to the primary winding of said induction motor, a filter device including inductance, a capacity and resistance components, said filter device being disposed electrically in series with said connections between said power supply source and said primary winding, said components being adjustable to impart to said filter device a selected value of capacitative reactance at the frequency of said alternating current power supply source for controlling the speed-torque characteristics of said induction motor.

4. A system for speed-torque control of induction motors as set forth in claim 3 in which said connections include a resistance component in addition to said filter device, where said resistance component is interposed in series between said filter device and the primary winding of said motor.

5. A system for speed-torque control of induction motors comprising an alternating current power supply source, an induction motor having primary and secondary windings, connections between said alternating current power supply source and the primary winding of said induction motor, and means interposed electrically in series with said connections between said power supply source and said primary winding for rendering the torque characteristic of said induction motor essentially independent of speed over the normal speed range of the motor, said means including series connected inductance, capacity and resistance components having linear characteristics.

6. A system for speed-torque control of induction motors comprising an alternating current power supply source, an induction motor including primary and secondary windings, connections between said alternating current power supply source and said induction motor, and capacitative reactance interposed electrically in series between said alternating current power supply source and said induction motor for controlling the slip at maximum torque of the induction motor according to the following equation:

$$s_m = \frac{cR'_2}{\sqrt{X_1^2(c-K^2)^2 + R_1^2}}$$

where $c$ is a control factor defined as follows:

$$c = \frac{X_1 - X_f}{X_1}$$

and K is the coefficient of coupling between the primary and secondary windings of the motor defined as:

$$K = \frac{X_m}{\sqrt{X_1 X_2'}}$$

in which $s_m$ designates the motor slip at maximum torque; $X_1$ is the per phase value of the self-reactance of the motor primary winding; $R_1$ is the per phase value of the motor primary winding resistance; $R'_2$ is the per phase value of the motor secondary winding resistance referred to the primary winding; $X_m$ is the per phase value of the mutual reactance between the motor primary and secondary windings referred to the primary winding; $X_f$ is the per phase value of the reactance of the circuit interposed in series between said alternating current power source and said induction motor wherein all said reactances are determined at the frequency of the power source.

7. A system for speed-torque control of induction motors as set forth in claim 6 in which the capacitative reactance is constituted by a parallel inductance capacity filter, said filter including capacitative reactance at frequencies above its anti-resonant frequency, and this capacitative reactance together with the input inductive reactance of the motor determining a series resonant frequency for the system above which the motor begins to generate power back into the supply source thus reducing the motor torque to zero.

ROLAND V. TIEDE.

References Cited in the file of this patent

UNITED STATES PATENTS

| Number | Name | Date |
|---|---|---|
| 1,736,689 | Alexanderson | Nov. 19, 1929 |
| 1,978,581 | Johnson | Oct. 30, 1934 |
| 2,222,714 | Kramer | Nov. 26, 1940 |
| 2,390,463 | Roters | Dec. 4, 1945 |
| 2,409,213 | Kilgore | Oct. 15, 1946 |

FOREIGN PATENTS

| Number | Country | Date |
|---|---|---|
| 365,605 | Great Britain | Jan. 22, 1932 |
| 643,661 | France | Mar. 21, 1928 |